④ United States Patent [11] 3,610,950

[72] Inventors Manfred Keller
Uberlingen;
Edgar Matejka, Singen, Hohentwiel, both of Germany
[21] Appl. No. 858,737
[22] Filed Sept. 17, 1969
[45] Patented Oct. 5, 1971
[73] Assignee Bodenseewerk Geratetechik GmbH
Uberlingen am Bodensee, Germany
[32] Priority Oct. 10, 1968
[33] Germany
[31] P 18 02 218.9

[54] SIGNAL SELECTION CIRCUIT
4 Claims, 4 Drawing Figs.

[52] U.S. Cl. 307/204, 307/219, 307/235, 328/147, 328/154
[51] Int. Cl. G06f 11/08, H03k 5/20
[50] Field of Search 307/235, 204, 219; 318/564; 340/146.1, 213 R; 244/770 V, 77 SE

[56] References Cited
UNITED STATES PATENTS

| | | | |
|---|---|---|---|
| 3,054,039 | 9/1962 | Meredith | 318/20.075 |
| 3,204,118 | 8/1965 | Rotier | 307/235 X |
| 3,305,735 | 2/1967 | Moreines | 307/219 |
| 3,492,588 | 1/1970 | Woodward, Jr. | 307/204 X |

OTHER REFERENCES

Marsocci, " A survey of Semiconductor Devices and Circuits in Computers," Semiconductor Products, January 1961, Vol. 4 #1, p. 31-37.

*Primary Examiner*—Donald D. Forrer
*Assistant Examiner*—L. N. Anagnos
*Attorney*—Darbo, Robertson & Vandenburgh

ABSTRACT: The apparatus selects the intermediate one of three input signals of different voltages and delivers that intermediate signal to an output. Each input signal is delivered to a respective operational amplifier. In addition to the effect of the input signals, the amplifiers are controlled by feedback from the apparatus output. A diode and resistor network is connected between the outputs of the amplifiers and the apparatus output so that only the intermediate of the three signals appears at the apparatus output and the remaining two are blocked.

MANFRED KELLER
EDGAR MATEJKA
INVENTORS

BY
Darbo, Robertson & Vandenburgh

MANFRED KELLER
EDGAR MATEJKA
INVENTORS

BY
Darbo, Robertson & Vandenburgh $I < I_p \rightarrow R \rightarrow 0$
$I > I_p \rightarrow R \rightarrow \infty$

MANFRED KELLER
EDGAR MATEJKA
INVENTORS

BY
Darbo, Robertson & Vandenburgh

MANFRED KELLER
EDGAR MATEJKA
INVENTORS

BY

Darbo, Robertson & Vandenburgh

SIGNAL SELECTION CIRCUIT

BACKGROUND AND SUMMARY OF THE INVENTION

The present invention relates to a signal selection circuit for selecting an output signal from the signals of redundant systems, for instance, of aircraft autopilots, having a logic circuit designed with diodes, by which the respective intermediate value of three input signals can be connected through to a signal output (voter).

In the design of systems in which high reliability is important, for instance, of aircraft autopilots, redundant components are frequently employed, i.e. components, structural groups or complete units are multiplied. Each of these redundant components supplies a signal. If one such redundant component fails, the function of the total system will not be impaired. The redundant components, usually three in all, provide a plurality of input signals from which an output signal is formed to be delivered to the apparatus to be operated thereby. To achieve this, there are two possibilities: First, the mean value of the three signals may be formed as output signal. This possibility, however, suffers from the shortcoming that a gross error in one of the input signals enters into this mean value and may lead to a significant falsification of the output signal.

The second possibility resides in a logic circuit arrangement (voter) which connects the respective intermediate tone signal (to be distinguished from the mean value) of the three input signals through to the output. Therefore, the intermediate one is the signal the magnitude of which is intermediate the magnitudes of the two other signals. Hence, if three signals $E_1$, $E_2$ and $E_3$ are related thus $E_1>E_2>E_3$, then the signal $E_2$ will be connected through to the output. This is done independently of what is the exact magnitude of $E_1$ and $E_3$ (as long as they are greater and smaller, respectively, than is $E_2$). The present invention relates to a circuit arrangement of this second type.

A prior art arrangement for the intermediate value formation operates with three operational amplifiers to which the three signals $E_1$, $E_2$ and $E_3$ are supplied, each through a respective resistor. The outputs of the operational amplifiers connect to one common signal output for the output signal $E_A$ through resistors. From the signal output a feedback is connected to the input of the operational amplifiers through resistors.

A prior art signal selection circuit for connecting the intermediate one of three signals, with respect to its magnitude, through to a signal output is designed as follows: The signal output connects to the positive pole of a voltage source through a resistor. It is connected with the negative pole of the voltage source through three diodes in a conducting direction with one resistor each in series-connection therewith. The three signal inputs for the signals $E_1$, $E_2$ and $E_3$ are connected through diodes with the conducting direction turned away from the signal inputs, with two connection points each of a respective one of the aforementioned diodes and associated resistors. In such a circuit, the respective greater one of the two signals appears at these latter connection points, the input of which are connected with these points through diodes. Therefore, across two such connection points the greatest one of the three signals will appear. The third connection point is connected with the intermediate and the smallest signals through diodes. There, the intermediate signal is developed. Therefore, two points are obtained across which the greatest one of the three signals is present, and a further point across which the intermediate one of the three signals is present. These three points are connected with the signal output through diodes, the conducting direction of the diodes being turned away from the signal output. The signal output, then, will assume the lowest potential of these three points. The diode leading to this point becomes conducting and the other diodes are blocked. This lowest potential, however, of the three connection points is the intermediate one of the three input signals. Such a circuit arrangement has the advantage that the failure of one of its structural elements does not become noticeable. It does, however, suffer from a number of shortcomings, residing in the fact that a low-resistance supply is necessary, whereas a high-resistance output is obtained. Moreover, a certain falsification of the output signal may occur due to imperfect structural elements. This falsification is particularly disadvantageous because it is dependent on temperature.

It is an object of the present invention to avoid these shortcomings of the prior art circuit arrangement.

According to the invention this is achieved in a signal selection circuit of the type mentioned in the beginning, in that the input signals are supplied to the logic circuit through operational amplifiers and a feedback from the one signal output of the logic circuit to the inputs of the amplifiers is provided. Thereby, the intermediate one of the three input signals multiplied by the resistance ratio determining the feedback, is obtained as output signal. The wiring of the operational amplifiers can be accomplished in the usual manner. The falsification of the output signal by the signal selection circuit is reduced by the factor of the circuit amplification (operational amplifier feedback) and by the same factor the dynamic output resistance is decreased. By the high-circuit amplification as it is customary in the operational amplifier technique, the described disadvantages are avoided.

The logic circuit may be designed in the previously described manner. Sometimes, however, it makes itself felt disadvantageously, that the available output power is relatively small. Moreover, the reliability of the logic circuit is impaired by the requirement of an additional voltage source.

It is, therefore, a further object of the present invention to provide a logic circuit (voter) of the type indicated which supplies a relatively high output power.

It is a still further object of the present invention to provide a logic circuit of the type indicated which does not require an additional voltage source.

This can be attained in that the output of each operational amplifier is connected with the signal output through two associated parallel branches each containing one resistor and one diode, the diodes being reversed in the two branches, and furthermore that, through two oppositely poled diodes, the output of each operational amplifier is connected with one such branch each of the other operational amplifiers in the point between resistor and diode, and that is with the respective branch in which the branch diode is poled in opposition to the diode connected thereto. With each pair of parallel branches (each branch comprising a resistor and a diode) a further resistor may be in series-connection between the pair and the signal output.

An improvement of the circuit furthermore results, if the resistors in the said branches are current-controlled nonlinear resistors.

DESCRIPTION OF SPECIFIC EMBODIMENTS

Figure 1:
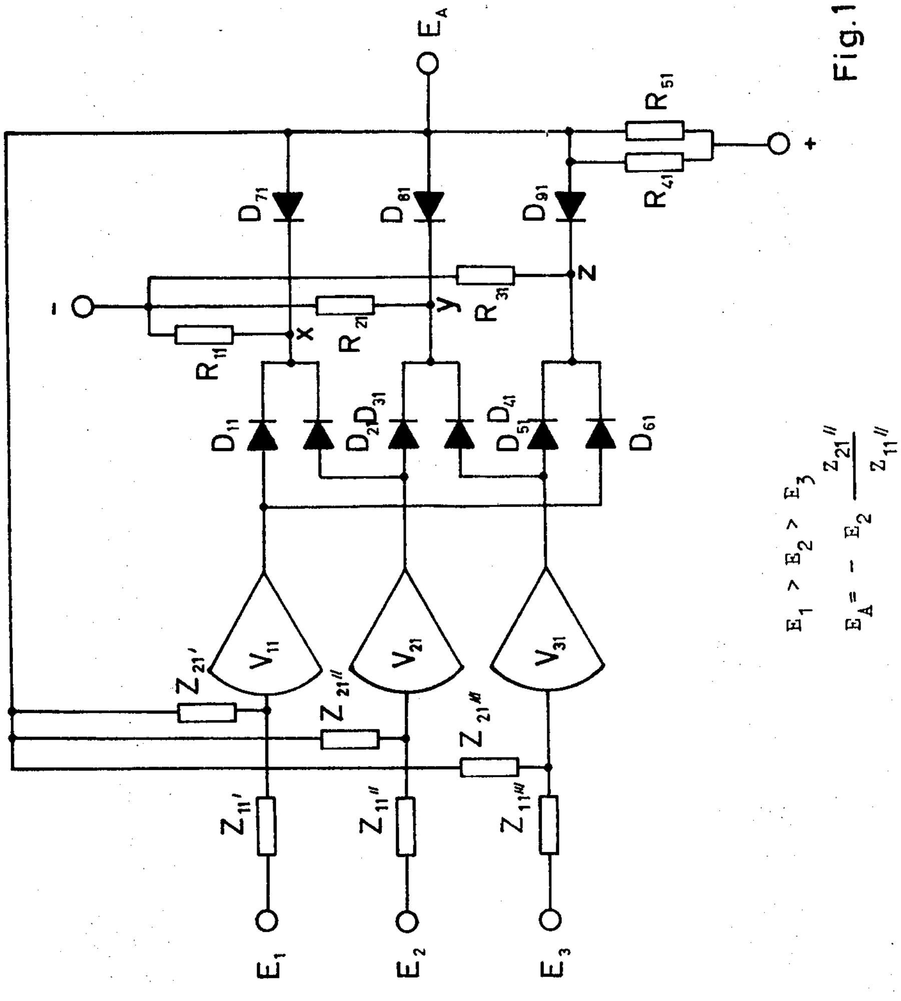
FIG. 1 illustrates a first signal selection circuit in accordance with the present invention.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

Through respective resistors $Z_{11'}$; $Z_{11''}$; $Z_{11'''}$; three signals $E_1$, $E_2$ and $E_3$ are each supplied to the input of a respective operational amplifier $V_{11}$, $V_{21}$ and $V_{31}$. The signal output for the output signal $E_A$ is connected with the positive pole of a voltage source through resistors $R_{41}$; $R_{51}$. Through three diodes $D_{71}$, $D_{81}$ and $D_{91}$ (whose conducting direction is turned away from the signal output) and resistors $R_{11}$, $R_{21}$ and $R_{31}$ in respective series-connection with the diodes, the signal output is connected with the negative pole of the voltage source. Three connection points X, Y and Z are obtained between the diodes $D_{71}$, $D_{81}$ and $D_{91}$ and the resistors $R_{11}$, $R_{21}$ and $R_{31}$. The output of the operational amplifier $V_{11}$ is connected with the point X through a diode $D_{11}$ and with the point Z through a diode $D_{61}$. The output of the operational amplifier $V_{21}$ is also connected with the point through a diode 21 and with the point Y through a diode $D_{31}$. The output of the operational amplifier $V_{31}$ is connected with the point Y through a diode $D_{41}$ and with the point Z through a diode $D_{51}$. The signal output is connected with the inputs of the three operational amplifiers $V_{11}$, $V_{21}$ and $V_{31}$ through the feedback resistors $Z_{21'}$; $Z_{21''}$ and $Z_{21'''}$. The diode circuit with the diodes $D_{11}$ to $D_{91}$ and the resistors $R_{11}$ to $R_{51}$ is the known logic circuit described above.

When disregarding the operational amplifiers, the forward voltage of the diodes and the feedback and assuming that $E_1$=1.1 volts, $E_2$=1.0 volt and $E_3$=0.9 volt, then the signal of the greatest value, that is 1.1 volts, will be obtained at the points X and Z through $D_{11}$ and $D_{61}$ respectively. Point Y is connected with the $E_2$ signal (equaling 1.0 volt) through $D_{31}$ and with the $E_3$ signal (equaling 0.9 volt) through $D_{41}$. Its potential, therefore, is 1.0 volt. Of the three points X, Y and Z, it is Y that has the smallest potential. This potential becomes effective across the signal output as $E_A$ through D**', while the diodes $D_{71}$ and $D_{91}$ are blocked. Similar are the conditions for other distributions of the signals $E_1$, $E_2$ and $E_3$. In any case the intermediate signal of the three input signals becomes effective as output signal $E_A$. By the operational amplifiers leading to a reversal of sign, and by the feedback (assuming, for instance, that $E_2$ is the intermediate signal) then $$E_A = -E_2 \cdot \frac{Z_{21''}}{Z_{11''}}$$

Figure 2:
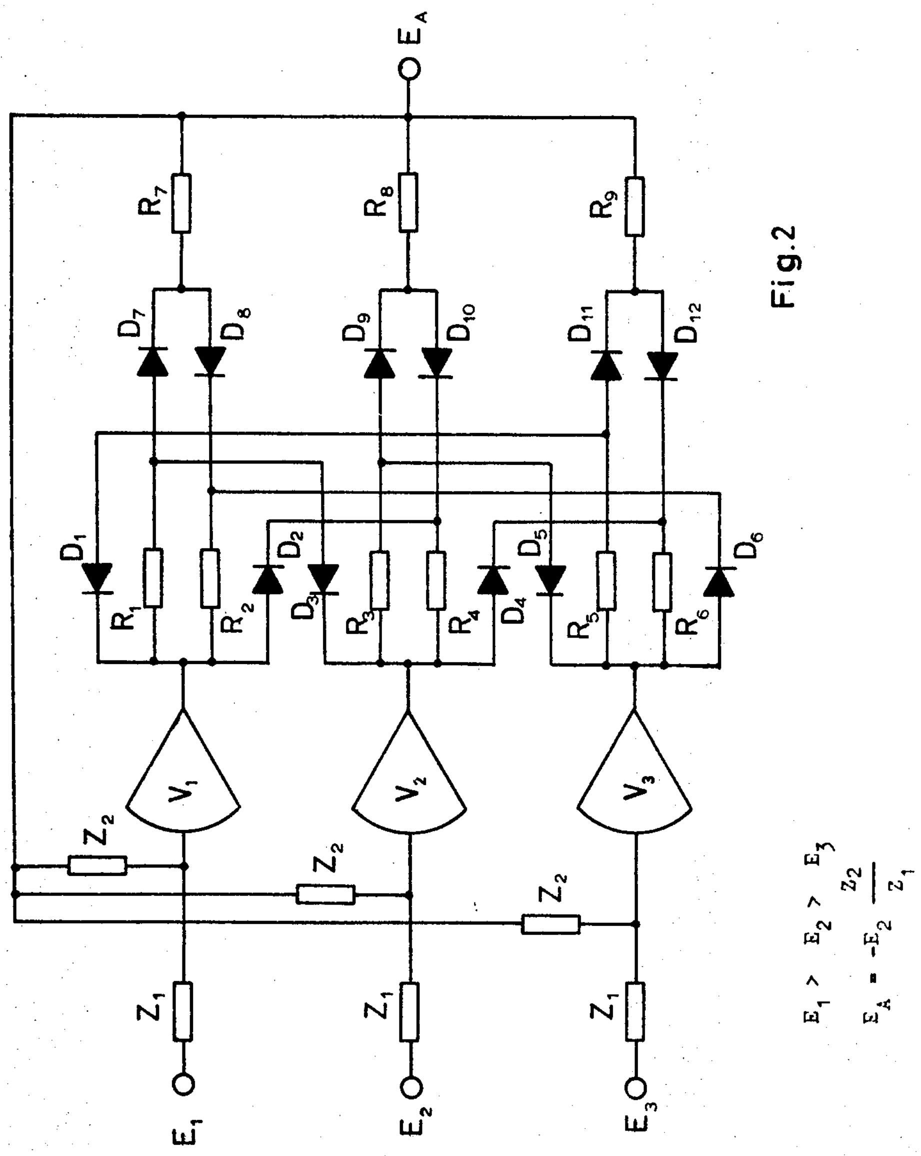
FIG. 2 illustrates an improved signal selection circuit in accordance with the present invention.

Another embodied form of the invention is shown in FIG. 2.

The three inputs for the signals $E_1$, $E_2$ and $E_3$ are connected with the inputs of three operational amplifiers $V_1$, $V_2$ and $V_3$ through resistors $Z_1$. The output of the operational amplifier $V_1$ is connected with the signal output for the signal $E_A$ through two parallel branches each comprising one resistor $R_1$ or $R_2$ and one diode each $D_7$ or $D_8$. A resistor $R_7$ is in series-connection with the two branches and the output. The diodes $D_7$ and $D_8$ are reversed with respect to each other in the two branches. Similarly, the operational amplifier $V_2$ is connected with the signal output through two parallel branches comprising resistor $R_3$ and diode $D_9$, and resistor $R_4$ and diode $D_{10}$, respectively. A resistor $R_8$ is in series-connection with the two branches. The diodes $D_9$ and $D_{10}$ are reversed with respect to each other. The operational amplifier $V_3$, is connected with the signal output through two parallel branches comprising the resistor $R_5$ and the diode $D_{11}$, and the resistor $R_6$ and the diode $D_{12}$, respectively. A resistor $R_9$ is in series-connection with the two branches. The diodes $D_{11}$ and $D_{12}$ are reversed in the two branches.

The output of the operational amplifier $V_1$ is connected through a diode $D_1$ with the connection point between the resistor $R_5$ and the diode $D_{11}$ which are in one of the branches associated with the operational amplifier $V_3$. The diode $D_1$ is poled with its conducting direction towards the operational amplifier $V_1$, whereas the diode $D_{11}$ is directed with its conducting direction towards the signal output, away from the said connection point. The output of the operational amplifier $V_1$ is connected through a diode $D_2$ with the connection point between the resistor $R_4$ and the diode $D_{10}$. The diode $D_2$ is poled in opposition to the diode $D_1$; thus, it has its conducting direction away from the operational amplifier $V_1$. The conducting direction of the the $D_{10}$, however, is directed towards the connection point with the diode $D_2$ and the resistor $R_4$.

The outputs of the other operational amplifiers $V_2$ and $V_3$ are connected similarly. Each of these outputs has connected thereto branches having resistors and reversed diodes, which branches are connected with the signal output through a resistor in series-connection with the signal output through a resistor in series-connection with the two branches. Besides, the output of each operational amplifier is connected through two oppositely poled diodes with the connection points between the diode and resistor in one branch each of the two other operational amplifiers, and that is in such a manner that the diodes in this connection and in the respective branch are poled in opposition to each other.

Thus, when following, for instance, the current path from the output of the operational amplifier $V_2$ through these diodes to the signal output, the output of the operational amplifier $V_2$ is connected with the connection point between the resistor $R_1$ and the diode $D_7$ through a diode $D_3$, and the diodes $D_3$ and $D_7$ are connected, in this current path toward the signal output, in opposition to each other: the diode $D_3$ is directed with its conducting direction towards the operational amplifier $V_2$, whereas the diode $D_7$ is directed with its conducting direction towards the signal output. Particularly, the output of the operational amplifier $V_2$, as said before, is connected through the diode $D_3$ with the connection point between the resistor $R_1$ and the diode $D_7$. In addition, the output of the operational amplifier $V_2$ is connected through the diode $D_4$ with the connection point between the resistor $R_6$ and the diode $D_{12}$. In the current path from the output of the operational amplifier $V_2$ to the signal output, the diode $D_4$ is turned away with its conducting direction from the operational amplifier, and the diode $D_{12}$ is turned away from the signal output.

The output of the operational amplifier $V_3$ is connected through a diode $D_5$, which is directed with its conducting direction towards the operational amplifier $V_3$, with the connection point between the resistor $R_3$ and the diode $D_9$ which latter is conducting for positive voltages in a direction towards the signal output. Further, the output of the operational amplifier $V_3$ is connected through diode $D_6$ with the connection point between the resistor $R_2$ and the diode $D_8$.

From the signal output the signal $E_A$ is connected in feedback to the inputs of the operational amplifiers $V_1$, $V_2$ and $V_3$ through resistors $Z_2$.

Figure 4:
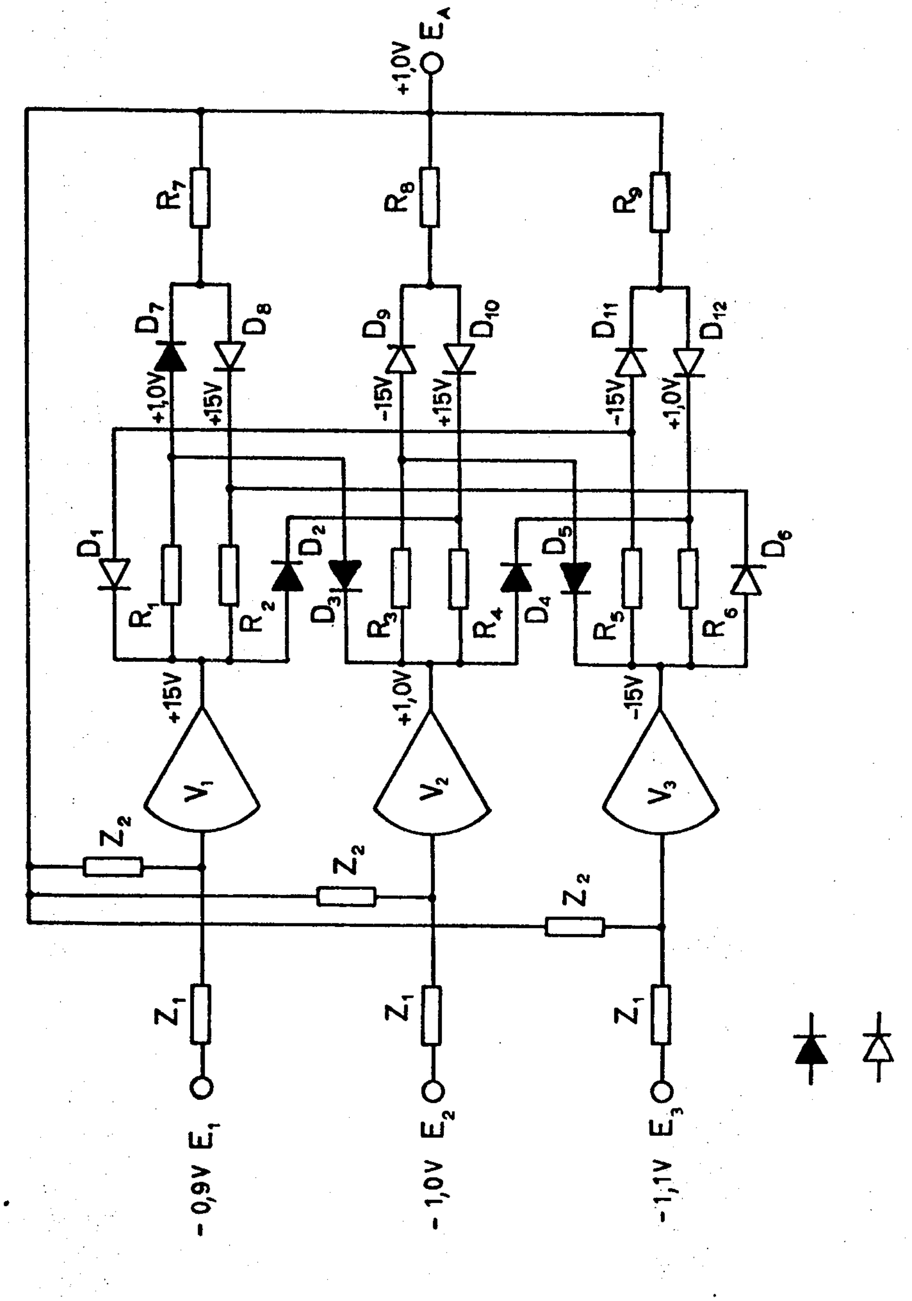
FIG. 4 is an illustration of the circuit of FIG. 2 with the assumption of specific signal relations and serves to elucidate the operation of the signal selection circuit in accordance with the present invention.

The operation of the described circuit shall be explained in greater detail by reference to FIG. 4. In FIG. 4 it shall be assumed that $E_1$=−0.9 volt $E_2$=1.0 volt and $E_3$=−1.1 volts. In FIG. 4 which otherwise conforms to FIG. 2, the potentials occurring in the various points have been marked. The conducting diodes are shown filled in black, while the nonconducting diodes are only outlined. Therein, it is assumed that $Z_1$=$Z_2$. By the operational amplifiers a reversal of sign of the voltages is effected.

The occurrence of the marked potentials may readily be verified. First, it shall be assumed teat the amplifier gain is just sufficient to overcome losses in the apparatus so that the apparatus actually supplies an output voltage $E_A$ of 1.0 volt, with an intermediate signal voltage of 1.0 volt. This output voltage corresponds to the intermediate value of the signals, $E_1$, $E_2$ and $E_3$, namely $E_2$, with the exception of the sign. By the finite positive or negative voltage applied across the operational amplifiers $V_1$ and $V_3$ through the feedback, the operational amplifiers $V_1$ and $V_3$ are driven into their positive or negative saturation which is assumed to be +15 volts or −15 volts. Then, the diodes $D_3$ and $D_7$ are conducting. For, $D_7$ between the voltage of +15 volts across the output of the operational amplifier $V_1$ and the signal output (assumed to be ) at +1.0 volts. Therefore, in this branch a current is flowing causing the diode $D_7$ to become conducting. Similarly, a current is also flowing through $R_1$ and $D_3$ so that the diode $D_3$ is conducting. Hence, the voltage of +1.0 volt across the output of the operational amplifier $V_2$ becomes effective across the signal output through $D_3$ and $D_7$. $D_8$ is blocked for the voltage of +15 volts. The same applies to $D_1$ which is connected between +15 volts across the output of the operational amplifier $V_1$ and −15 volts at the connection point between $R_5$ and $D_{11}$. $D_{11}$ is blocked as it is connected in the conducting direction between −15 volts across the signal output. $D_2$ is conducting since it is connected between the output of the operational amplifier $V_1$ at +15 volts and the output of the operational amplifier $V_2$ at 1.0 volt across the resistor $R_4$.

Consequently, the voltage of +15 volts is effective at the connection point between the resistor $R_4$ and the diode $D_{10}$. Accordingly, the diode $D_{10}$ is blocked. Further, the diode $D_4$ is conducting since it is connected between +1 volt across the output of the operational amplifier $V_2$ and −15 volts across the output of the operational amplifier $V_3$ through the resistor $R_6$. Thereby, the voltage of +1.0 volt appears at the connection point between the resistor $R_6$ and the diode $D_{12}$. However, the diode $D_{12}$ is blocked since across both sides of the diode $D_{12}$ =1 volt is applied.

As the circuit is designed cyclic, it will operate analogously for another distribution of the signals $E_1$, $E_2$ and $E_3$, however, always in such a manner that the output signal $E_A$ corresponds to the intermediate value, thus not the means value, of the three input signals.

Figure 3:
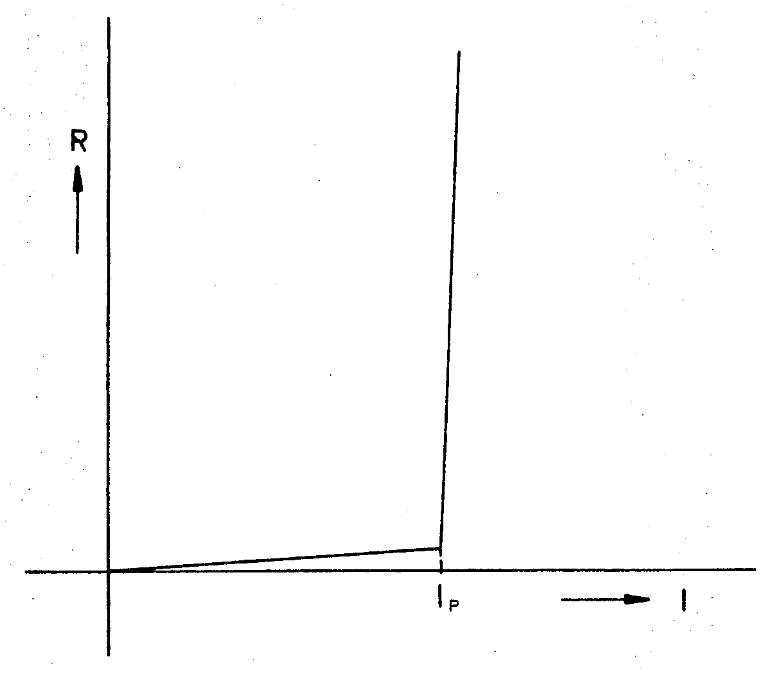
FIG. 3 illustrates a desirable resistance characteristic of resistors in the circuit of FIG. 2.

The circuit would operate particularly advantageously, if the resistors $R_1$ to $R_6$ were current-controlled nonlinear resistors having a characteristic approximately according to FIG. 3.

We claim:

1. In a signal selection apparatus for use in selecting the intermediate one of three input signals delivered to three respective inputs of the apparatus and for producing at an output of the apparatus an output signal which substantially corresponds to said intermediate one signal, said apparatus having three channels each connected to said output and connected to a respective input, each channel including diode means for determining which signal is the intermediate one and for applying said one at said output, the improvement comprising:

three operational amplifiers, each of said amplifiers being in a respective one of said channels, between the respective input and the respective diode means, each of said amplifiers having an input an output, each channel including a pair of parallel branches between the respective amplifier output and the apparatus output, each branch comprising a branch comprising a branch resistor in series with a branch diode and forming a connecting point therebetween, the diode in one branch of each pair being reversed with respect to the other branch of that pair so far as conduction between the respective amplifier output and the apparatus output is concerned and A pair of crosschannel-connecting diodes for each of said channels, one diode each pair of crosschannel-connecting diodes being connected between the amplifier output of the respective channel and a connecting point of a second channel and the other diode of that pair being connected between said amplifier output of said respective channel and a connecting point of a third channel, the two diodes of each pair being reversed with respect to each other, the arrangement being such that the two diodes connected to each connecting point are reversed as to conductivity with respect to each other; and feedback means connected between said apparatus output and the amplifier inputs respectively.

2. In an apparatus as set forth in claim 1 wherein said branch resistors are connected to the amplifier output of the respective channels; and of the connection between the branch diodes of the two branches of each channel and the apparatus output includes a resistor for each of the respective channels.

3. In an apparatus as set forth in claim 2, wherein each of said branch resistors is a current-controlled nonlinear resistor 4. In a signal selection apparatus for use in selecting the intermediate one of three input signals of approximately a given magnitude delivered to three respective inputs of the apparatus and for producing at an output of the apparatus an output signal which substantially corresponds to said intermediate one signal, said apparatus having three channels each connected to said output and connected to a respective input, each channel including diode means for determining which signal is the intermediate one and for applying said one a said output, the improvement comprising:

three operational amplifiers, each of said amplifiers being in a respective one of said channels, between the respective input and the respective diode means, each of s aid amplifiers having an input and an output said amplifiers being capable of being driven to positive saturation by an input signal somewhat in excess of said given magnitude and being driven to negative saturation by an input signal somewhat less than said given magnitude; and feedback means connected between said apparatus output and the amplifier inputs respectively, said feedback means providing a feedback signal such that the signal at the apparatus output is substantially equal to the strength of s said intermediate one signal at the respective apparatus input.

UNITED STATES PATENT OFFICE
CERTIFICATE OF CORRECTION

Patent No. 3,610,950 Dated October 5, 1971

Inventor(s) Manfred Keller and Edgar Matejka

It is certified that error appears in the above-identified patent and that said Letters Patent are hereby corrected as shown below:

Column 1, line 27, "tone" should be - one -; column 3, line 18, after "point" insert - X -; column 3, line 37, "D**" should be - $D_{81}$ -; column 3, line 41, "$E_a$" should be - $E_A$ -; column 4, line 6, omit "and" (second occurrence) and insert - diode -; column 4, lines 12 & 13, omit "with the signal output through a resistor in series-connection"; column 4, line 73, after "$D_7$" (second occurrence) insert - is in series-connection with the resistor $R_1$ and the resistor $R_7$ -; column 5, line 11, after "across" insert - and from the output of the operational amplifier $V_3$ and +1 volt across -; column 5, line 24, "=" should be - + -; column 5, line 48, after "input" insert - and -; column 5, lines 51 & 52, after "comprising" delete - a branch comprising -.

Signed and sealed this 2nd day of May 1972.

(SEAL)
Attest:

EDWARD M.FLETCHER,JR.
Attesting Officer

ROBERT GOTTSCHALK
Commissioner of Patents